(12) United States Patent
Lalgudi et al.

(10) Patent No.: US 10,952,431 B2
(45) Date of Patent: Mar. 23, 2021

(54) RELEASABLE ENCAPSULATION COMPOSITIONS

(71) Applicant: Battelle Memorial Institute, Columbus, OH (US)

(72) Inventors: Ramanathan S. Lalgudi, Westerville, OH (US); Robert J. Cain, Lewis Center, OH (US)

(73) Assignee: Battelle Memorial Institute, Columbus, OH (US)

( * ) Notice: Subject to any disclaimer, the term of this patent is extended or adjusted under 35 U.S.C. 154(b) by 133 days.

(21) Appl. No.: 16/091,606

(22) PCT Filed: Apr. 8, 2017

(86) PCT No.: PCT/US2017/026726
§ 371 (c)(1),
(2) Date: Oct. 5, 2018

(87) PCT Pub. No.: WO2017/177210
PCT Pub. Date: Oct. 12, 2017

(65) Prior Publication Data
US 2019/0159448 A1 May 30, 2019

Related U.S. Application Data

(60) Provisional application No. 62/319,907, filed on Apr. 8, 2016, provisional application No. 62/335,987, filed on May 13, 2016.

(51) Int. Cl.
*C11D 17/00* (2006.01)
*C11D 3/39* (2006.01)
(Continued)

(52) U.S. Cl.
CPC ............ *A01N 25/28* (2013.01); *A01N 25/04* (2013.01); *A01N 25/30* (2013.01); *A01N 43/38* (2013.01);
(Continued)

(58) Field of Classification Search
None
See application file for complete search history.

(56) References Cited

U.S. PATENT DOCUMENTS 4,290,903 A    9/1981  Macgilp et al.
4,762,637 A *  8/1988  Aronson ............ C11D 3/3953
                                                        252/186.34
(Continued)

FOREIGN PATENT DOCUMENTS

EP    2468092 A1    6/2012
WO    9706688       2/1997
(Continued)

OTHER PUBLICATIONS

Written Opinion of International Searching Authority for corresponding PCT/US2017/026727, dated Oct. 9, 2018.
(Continued)

*Primary Examiner* — Lorna M Douyon
(74) *Attorney, Agent, or Firm* — Greer, Burns & Crain, Ltd.

(57) ABSTRACT

A releasable encapsulation composition is described. The composition comprises a plurality of capsules, each capsule comprising an amphiphilic material encapsulating a substance, such as an active ingredient. The substance is releasable from encapsulation by a change in the amphiphilic material triggered by a change in the environment around the capsule.

10 Claims, 6 Drawing Sheets

(51) Int. Cl.

| | | |
|---|---|---|
| *C11D 3/37* | (2006.01) | |
| *A01N 25/28* | (2006.01) | |
| *A01N 25/04* | (2006.01) | |
| *A01N 53/00* | (2006.01) | |
| *C11D 3/395* | (2006.01) | |
| *A01N 25/30* | (2006.01) | |
| *D06M 13/236* | (2006.01) | |
| *D06M 23/12* | (2006.01) | |
| *A01N 43/38* | (2006.01) | |

(52) U.S. Cl.
CPC ............ *A01N 53/00* (2013.01); *C11D 3/3796* (2013.01); *C11D 3/3935* (2013.01); *C11D 3/3951* (2013.01); *C11D 17/0039* (2013.01); *D06M 13/236* (2013.01); *D06M 23/12* (2013.01)

(56) References Cited

U.S. PATENT DOCUMENTS

| | | | |
|---|---|---|---|
| 5,019,392 A | 5/1991 | Wallach | |
| 5,849,264 A | 12/1998 | Bassam et al. | |
| 6,107,266 A * | 8/2000 | Himmrich ............ | C11D 3/3907 510/349 |
| 6,277,404 B1 | 8/2001 | Laversanne et al. | |
| 2002/0136773 A1 | 9/2002 | Scher et al. | |
| 2004/0166165 A1 * | 8/2004 | Mistry ................. | C11D 3/3703 424/490 |
| 2007/0196410 A1 | 8/2007 | Jadhav et al. | |
| 2011/0053825 A1 | 3/2011 | Lalgudi | |
| 2011/0223206 A1 | 9/2011 | Lebouille et al. | |
| 2016/0024441 A1 | 1/2016 | Cosgrove et al. | |
| 2017/0166845 A1 * | 6/2017 | Duncalf ............. | C11D 11/0017 |

FOREIGN PATENT DOCUMENTS

| | | |
|---|---|---|
| WO | 03051116 A1 | 6/2003 |
| WO | 2007036710 A2 | 4/2007 |
| WO | 2007081961 A2 | 7/2007 |
| WO | 2013005009 A1 | 1/2013 |
| WO | 2013105107 A2 | 7/2013 |
| WO | 2015127051 A1 | 8/2015 |
| WO | WO 2015/118357 A2 * | 8/2015 |

OTHER PUBLICATIONS

Written Opinion of International Searching Authority for corresponding PCT/US2017/026726, dated Oct. 9, 2018.
International Search report for international application No. PCT/US2017/026726, dated Jul. 20, 2017.
International Search report for international application No. PCT/US2017/026727, dated Jun. 30, 2017.
Alonso, M.L., et al., Advantages of biocides: B-cyclodextrin inclusion complexes against active components for pesticide industry, International Journal of Enviromental Analytical Chemistry, 92:8, 963-978, 2012.
Yang, Ji Sheng, et al., Synthesis of Amidic Alginate Derivatives and Their Application in Microencapsulation of X-cyhalothrin, Biomacromolecules 2011, 12, 2982-2987.
Kumar, Ashok, Smart Polymeric Biomaterials: where Chemistry & Biology can merge. Available at: <http:// www.iitk.ac.in/directions/dirnet7/PP~ASHOK~FFF .pdf>. Acessed on: 02 out. 2011.
Joshi, Rucha, Smart Microspheres for Stimuli Responsive Drug Delivery, submitted to Faculty of Graduate School of Vanderbilt University, Nashville, Tennessee, Dec. 2011.
Peteu, Serban F., et al., Responsive Polymers for Crop Protection, www.mdpi.com/journal/polymers, Aug. 2010.
Ghizal, Rushi, et al., Smart Polymers and Their Applications, International Journal of Engineering Technology, Management and Applied Sciences, Sep. 2014, vol. 4, Issue 4.
Narayan, Ramani, Biodegradable Plastics, Michigan Biotechnology Institute and Michigan State University, 1993, Michigan.
Aguilar, M.R., Smart Polymers and Their Applications as Biomaterials, Topics in Tissue Engineering, vol. 3, 2007.

* cited by examiner

RELEASABLE ENCAPSULATION COMPOSITIONS

This application is a U.S. National Phase under 35 U.S.C. § 371 of International Application No. PCT/US2017/26726, filed Apr. 8, 2017, which claims the benefit of U.S. Provisional Application No. 62/335,987 which was filed May 13, 2016, and U.S. Provisional Application No. 62/319,907 which was filed Apr. 8, 2016, and the contents of which are hereby incorporated by reference in their entirety.

BACKGROUND OF THE INVENTION

This invention relates in general to encapsulation materials and methods, and in particular to active ingredients releasably encapsulated by amphiphilic materials.

The practice of protecting active ingredients from an incompatible environment by encapsulation is well known. Encapsulation may be employed for a variety of reasons, including protecting active ingredients from oxidation, preventing volatile losses, preventing chemical reaction or improving the handling characteristics of active ingredients. The protective coating or shell is ruptured at the time of desired action of the ingredient. The rupturing of the protective shell is typically brought about through the application of chemical or physical stimuli such as pressure, shear, melting, response solvent action, enzyme attack, chemical reaction or physical disintegration.

A number of companies have worked on improvements in encapsulation materials, including Revolymer Limited (U.K.) as disclosed in their published international patent applications WO 2009/050203, WO 2011/064555, WO 2012/140442 and WO 2014/140550A1; and Novozymes A/S (Denmark) as disclosed in WO 2016/023685.

There is still a need for further improvements in encapsulation materials, particularly in regards to the releasable encapsulation of active ingredients.

DESCRIPTION OF THE INVENTION

The present invention relates to a releasable encapsulation composition comprising a plurality of capsules, each capsule comprising an amphiphilic material encapsulating a substance such as an active ingredient. The substance is releasable from encapsulation by a change in the amphiphilic material triggered by a change in the environment around the capsule. Changes in the environment around the capsule include, but are not limited to dilution of a liquid in which the capsules are dispersed, and changes in the pH of the liquid.

In a particular embodiment, the encapsulating materials have well-balanced hydrophilic and hydrophobic chemical moieties that are useful for encapsulating active ingredients which can be released when desired upon dilution.

The addition of materials with well-balanced hydrophilic and hydrophobic moieties to an active ingredient results in the encapsulation of the active ingredient via association of the amphiphilic materials onto the active ingredient. The association of the material onto the active ingredient may be driven by one or a combination of noncovalent forces such as dipole, hydrogen bonding, van der Waals, electrostatic, cation-pi electron interaction, or hydrophobic effects.

The association of the amphiphilic material will be strong at low liquid content, and as the concentration of liquid increases (dilution), the association weakens which results in the release of the active ingredient. The liquid is typically water; however, other liquids could also be used. Suitable liquids include, but are not limited to water, methanol, ethanol, isopropyl alcohol, hexane, nonane, dodecane, N-methyl-2-pyrrolidone, dimethyl formamide, and dimethyl acetamide. The pH of the mixture can be changed by adding a compound which is more acidic or more basic than the solution with the capsules, causing the release of the active ingredient.

The amphiphilic material is a material composed of hydrophilic and hydrophobic portions or parts, which in certain embodiments are hydrophilic and hydrophobic sections or blocks. In certain embodiments involving block copolymers or surfactants useful for forming micelles, the amphiphilic material has a hydrophilic-lipophilic balance (HLB) within a range of from about 1 to about 20, or from about 11 to about 20, or from about 14 to about 18.

The hydrophilic portion anchors the encapsulated substance, and the hydrophobic portion forms a shell wall of the capsule.

In certain embodiments, the amphiphilic material is a polymer, and more particularly, a copolymer such as a graft copolymer or a block copolymer.

In some non-limiting examples, the amphiphilic material may be included in one or more of the following classes of materials: a graft copolymer, a modified N,N,N',N'-Tetrakis (2-hydroxypropyl)ethylenediamine, a cationic nanoparticle, a diblock or triblock copolymer, an ionic or nonionic surfactant, a low surface energy silica, a Guerbet ester, or a poly(stearyl methacrylate-co-acrylic acid).

For example, the amphiphilic material may be one or more of the following:

a non-ionic graft copolymer, such as poly(laurylmethacrylate)-g-polyethylene oxide (PLMA-g-PEG) (50: 50, 75:25) or hydrophobically modified starch;

a material prepared by modification of N,N,N',N'-Tetrakis (2-hydroxypropyl) ethylenediamine with trimethyl silyl chloride, with epoxy, or with a fluorinated epoxy mixture of poly(dimethyl siloxane)-amine (PDMS-amine) with fluoro trichlorosilane 1% siloxane/N-alkyl emulsion;

a material prepared by modification of epoxy functional terminated polyethylene oxide, with amine functional terminated poly(dimethyl siloxane) (PDMS-PEO-PDMS)

a cationic nanoparticle, such as a cationic nanoparticle prepared as described in the U.S. Pat. No. 9,000,203 by a sol-gel condensation of 3-aminopropyl trimethoxy silane and tridecafluoro-1,1,2,2-tetrahydrooctyl triethoxysilane.

a cationic nanoparticle, such as a cationic nanoparticle prepared as described in the U.S. Pat. No. 9,000,203 by a sol-gel condensation of 3-aminopropyl trimethoxy silane and a non-bioaccumulating fluorosilane such as trimethoxy(3,3,3-trifluoropropyl)silane a non-ionic triblock polymer obtained by reacting monomethoxy terminated poly ethylene oxide with heptadecane dicarboxylic acid methyl ester such as C19 di-PEG;

a non-ionic triblock polymer obtained by reacting monohydroxyl terminated poly ethylene oxide with heptadecane dicarboxylic acid such as C19 di-PEG a heptadecane carboxylic acid ester salts such as C19 di-acid salts with, Na+, K+, or Ca 2+ ions;

a tert-octyl phenol derivative of sulfonated dichloro diphenyl sulfone, such as or a nonyl phenol derivative of sulfonated dichloro diphenyl sulfone, or a poly(dimethyl siloxane) derivative of sulfonated dichloro diphenyl sulfone;

a low surface energy nonionic surfactant, such as isostearic acid-g-PEG;

a low surface energy graft copolymer, such as isostearic acid PEG triblock ester or isostearic acid-ester-co-PEG-methacrylate;

a low surface energy silica, such as isostearic acid ester silica;

a Guerbet ester, such as a highly branched tri-isostearic acid citrate ester;

a poly(stearyl methacrylate co acrylic acid), such as poly(stearyl methacrylate)-co-acrylic acid (PSMA-co-AA) 80:20;

a poly(stearyl methacrylate co N,N'-dimethylamino ethyl methacrylate, NN-DMEA), such as poly(stearyl methacrylate)-co-NN-DMEA (PSMA-co-PNNDMEA) 50:50;

a non-ionic diblock copolymer prepared by reacting mono hydroxy polyethylene oxide with 1-bromo octadecane;

a nonionic triblock copolymer prepared by reacting di hydroxy polyethylene oxide with 1-bromo octadecane;

a non-ionic diblock copolymer prepared by reacting mono hydroxy polyethylene oxide with linolenic acid; or a non-ionic diblock copolymer prepared by reacting mono hydroxy polyethylene oxide with linoleic acid.

By cationic non-bio accumulating fluoropolymer, we mean a fluoropolymer with less than a 6 fluorocarbon chain. By low surface energy, we mean the surface energy is less than about 20 dynes/cm.

The encapsulated substance can be liquid, solid, gas, or combinations thereof. The substance may be an active ingredient; i.e., a component of a chemical product which helps directly in achieving its performance objectives. Some non-limiting examples of active ingredients are bleach activators, peroxygen compounds, functional polymeric binders (for example isocyanate functional polymer, epoxy functional polymer, amino functional polymer, acrylate functional polymer, carboxyl functional polymer, hydroxyl functional polymer, cyclic carbonate functional polymer, trialkoxy silyl functional polymer). For example, the active ingredient may be bleach activator, such as tetraacetylethylene-diamine (TAED), nonanoyloxybenzenesulfonate (NOBS); peroxygen compounds, such as sodium percarbonate, sodium perborate, or ε-phthalimido-peroxy-hexanoic acid (PAP).

The substance may be encapsulated by the amphiphilic material by any suitable method. Some encapsulation techniques include, but are not limited to, dispersion, suspension, emulsification, and coating via conventional and electrostatic spray.

When the active ingredient is a solid or a liquid, it can be mixed in a solution of the amphiphilic material. The amphiphilic material forms a coating around the solid or liquid particles. In some cases, the active ingredient can be dissolved in a solvent (such as water, methanol, ethanol, isopropyl alcohol, hexane, nonane, dodecane, N-methyl-2-pyrrolidone, dimethyl formamide, and dimethyl acetamide) before being mixed into the solution of amphiphilic material. The solvent used to dissolve the amphiphilic material should be immiscible with the solvent used to dissolve the active ingredient. For example, if the active ingredient to be encapsulated is soluble in water (e.g., a water soluble functional polymer binder, such as an amino functional polymer such as polyethylene imine), then an organic solvent is used to dissolve the amphiphilic material, and water to dissolve the active ingredient.

Solid or liquid active ingredients should be sparingly soluble in the liquid used for the solution of the amphiphilic material. By sparingly soluble, we mean the solubility of the solute is less than about 3 g in 100 ml of the liquid. Gases can be encapsulated by bubbling the gas through the solution containing the amphiphilic material. The capsules can be nanocapsules and/or microcapsules. The capsules are typically in the range of about 10 nm to about 500 μm, or about 0.1 μm to about 100 μm, or about 1 μm to about 50 μm.

In some embodiments, the capsules are stable at alkaline pH.

Figure 1:
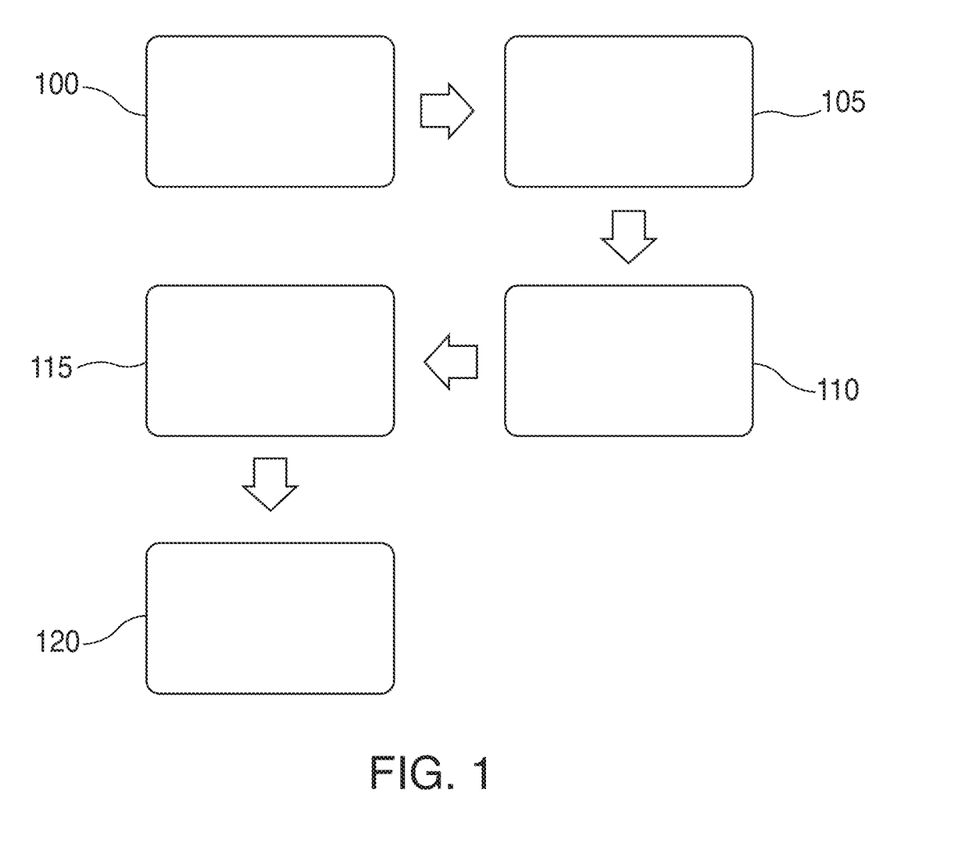
FIG. 1 is a flow chart of one embodiment of the encapsulation of an active ingredient with a copolymer.

In addition to the amphiphilic material, an additional surfactant (or co-surfactant) can be added to the mixture. Examples of co-surfactants include, but are not limited to, Sodium dodecyl sulfate, Sodium dodecylbenzenesulfonate, Sodium laureth sulfate, Sodium lauroyl sarcosinate, Sodium myreth sulfate, Sodium nonanoyloxybenzenesulfonate, Sodium stearate, Sulfolipid, Benzalkonium chloride, Benzyldodecyldimethylammonium bromide, Cetylpyridinium chloride, Dimethyldioctadecylammonium bromide, Dodecyltrimethylammonium bromide, Hexadecylpyridinium chloride, Tridodecylmethylammonium chloride FIG. 1 is a flow chart of the encapsulation of an active ingredient with an amphiphilic material. In step 100, an active ingredient, such as TAED, is suspended in a solvent, such as hexane. In step 105, amphiphilic material is added. In step 110, in some cases, the amphiphilic material forms micelles. In step 115, if micelles are formed, the micelles are deposited onto the active ingredient with the amphiphilic material. Otherwise, the amphiphilic material encapsulates the active ingredient without forming micelles. The product can then be isolated in step 120.

The release rate of the active ingredient from the capsules is controlled by a number of factors. One is the amount of amphiphilic material used in step 100. Higher amounts of amphiphilic material in step 100 result in decreased release rates of the active ingredient. The release rate of the active ingredient from the capsules is further controlled by the CMC of the amphiphilic material used in step 100. The higher the CMC of the amphiphilic material in step 100, the lower the release rate of the active ingredient. The release rate of active ingredient from the capsules is further controlled by the ratio of organic solvents to the active ingredients in step 105. The higher the ratio of organic solvents to the active ingredients in step 105, the lower the release rate of the active ingredient.

In certain embodiments, the amphiphilic material is an amphiphilic polymer capable of forming a micelle around the substance when the capsule is dispersed in a liquid. The substance is releasable from encapsulation by a change in the association of the micelle onto the substance triggered by a change in the liquid. For example, this may involve the micelle coming apart from the substance, such as by exfoliating rather than solubilizing, when the liquid is diluted or the pH of the liquid is changed. By exfoliating, we mean the amphiphilic material disassociates from the substance. By solubilizing, we meant the dissolution of the amphiphilic material when diluted in the liquid.

Micelles form only when the concentration of the polymer is greater than the critical micelle concentration (CMC). In certain embodiments, capsules have a CMC within a range of from about 0.0001 wt % to about 50 wt %. In addition, micelles only form when the temperature is above the critical micelle temperature (CMT) (also known as the cloud point or Krafft temperature). The CMT depends on a number of factors including the molecular weight of the polymer, the ratio of the hydrophobic portion to the hydrophilic portion, and functionality of the hydrophilic moiety. In general, the higher the amount of the hydrophobic portion, the higher the critical micelle temperature.

In general, block copolymers having a number average molecular weight less than 100,000 kD will form micelles. Examples of amphiphilic polymers forming micelles include, but are not limited to, PEO-PPO-PEO, PEO-PPO, PDMS-PEO-PDMS, PDMS-PEO, C19-diPEG, diblock copolymer prepared by reacting mono hydroxy polyethylene oxide with 1-bromo octadecane, nonionic triblock copolymer prepared by reacting di hydroxy polyethylene oxide with 1-bromo octadecane, C19 dicarboxylic acid salts, tert-octyl phenol derivative of sulfonated dichloro diphenyl sulfone, nonyl phenol derivative of sulfonated dichloro diphenyl sulfone, and poly(dimethyl siloxane) derivative of sulfonated dichloro diphenyl sulfone.

Figure 2:
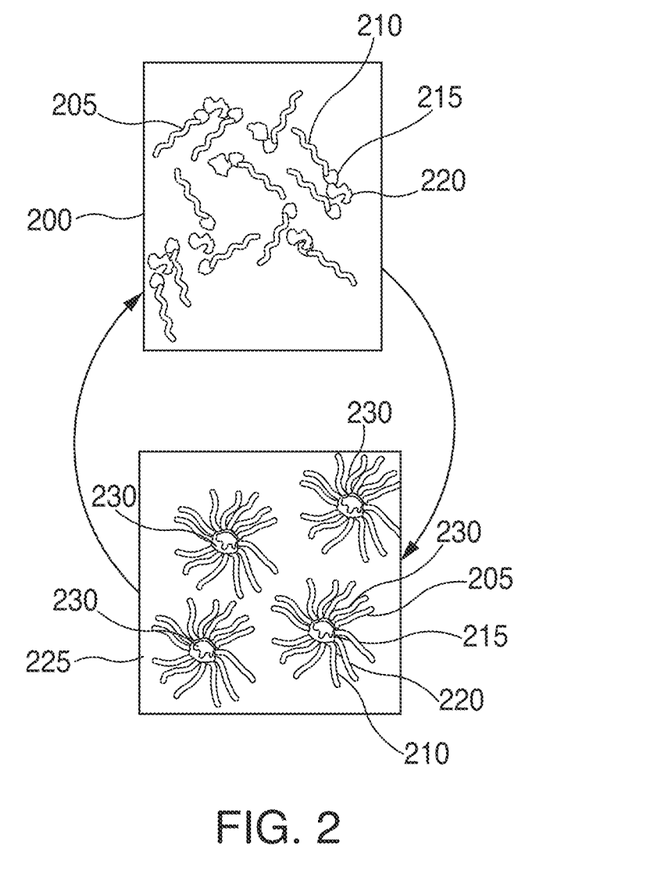
FIG. 2 is a schematic representation of an active ingredient being releasably encapsulated in polymer micelles.

FIG. 2 is a schematic representation of the encapsulation of an active ingredient in amphiphilic micelles. As shown, in the first step 200, an amphiphilic material 205 is dispersed in a solvent, such as water. The amphiphilic material 205 has a hydrophilic segment 210 and a hydrophobic segment 215. The hydrophobic segment 215 of the amphiphilic material is adsorbed onto the active ingredient 220.

Above the CMC and CMT of the amphiphilic material 205 as shown in the second step 225, the amphiphilic material 205 forms micelles 230 around the active ingredient 220. The active ingredient 220 is encapsulated inside a hydrophobic core of the micelle 230 formed by the hydrophobic segment 215 of the amphiphilic material 205. The hydrophilic segment 210 of the amphiphilic material 205 extends radially outward and forms the shell of the micelle 230.

When the concentration of the solvent is increased above the CMC of the amphiphilic copolymer 205, the micelles 230 come apart and thereby release the active ingredient 220 into the solvent. This can occur, for example, by dilution of the aqueous medium.

Alternatively, the pH of the solvent can be changed by adding an acidic or basic component, leading to the destruction of the micelles 230.

Figure 3:
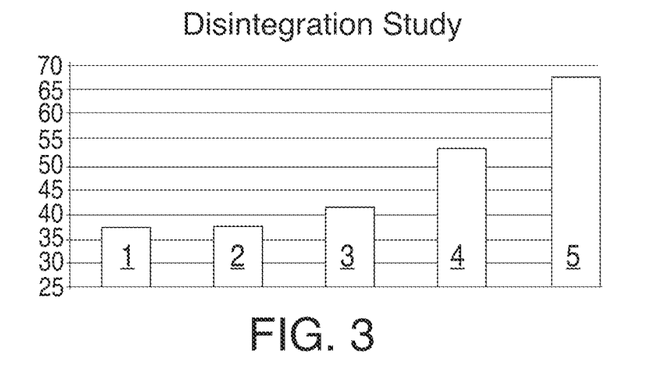
FIG. 3 is a bar graph showing the results of a micellar disintegration study.

FIG. 3 illustrates the disintegration of micelles by dilution with water in graphical form. The amphiphilic material was a non-ionic diblock copolymer prepared by reacting mono hydroxy polyethylene oxide with 1-bromo octadecane. When the copolymer was dissolved in water at a concentration of 0.01 wt %, the surface tension of the water was 37.5 dynes/cm (bar 1). When the copolymer was dissolved in water at a concentration of 0.0035 wt % and exposed to 9.5 pH aqueous solution, the surface tension of the water was 38.1 dynes/cm (bar 2). When the copolymer was dissolved in water at a concentration of 0.0035 wt % the surface tension of the water was 42.1 dynes/cm (bar 3). When the copolymer was dissolved in water at a concentration of 0.006 wt % and exposed to 9.5 pH aqueous solution, the surface tension of the water was 54.1 dynes/cm (bar 4). For reference purposes, the surface tension of water is 70 dynes/cm (bar 5). When more water added to the micelles, the surface tension increased and approached the value of water, which suggests that the non-ionic diblock copolymer prepared by reacting mono hydroxy polyethylene oxide with 1-bromo octadecane disintegrates on dilution.

For TAED, a preferred amphiphilic material is poly (acrylic acid)/poly (stearyl methacrylate co N,N'-dimethyl-amino ethyl methacrylate). For ε-phthalimido-peroxy-hexanoic acid (PAP), a preferred amphiphilic material is a diblock copolymer prepared by reacting mono hydroxy polyethylene oxide with 1-bromo octadecane.

In another embodiment, the present invention relates to a product including the above-described releasable encapsulation composition, and one or more additional ingredients useful for formulating the product. Additional ingredients include, but are not limited to, thickening agents (e.g., polyvinyl alcohol, poly vinyl pyrrolidone, and carboxyl methyl cellulose), and co-solvents (e.g., glycerol, and 1,2-propylene glycol).

Some non-limiting examples of categories of products are cleaning products, oxygen delivery products, and personal care products. For example, the product may be a cleaning product for consumer or industrial applications, or an oxygen delivery product for wound care.

Hereinafter, the present invention is described with reference to specific examples, but it is not to be limited thereto.

EXAMPLES

Example 1

Encapsulation of ε-phthalimido-peroxy-hexanoic acid (PAP)

In the first step, the amphiphilic material, poly(ethylene oxide)-b-octadecane, was made using the following procedure:

In a 250 mL round bottom reaction flask fitted over a stir plate, a Teflon coated magnetic stir bar, thermocouple, dry inert argon gas inlet and water cooled condenser, 16.50 grams of mono hydroxyl polyethylene oxide (average Mn 550, CAS 9004-74-4) and 30.00 grams of toluene (CAS108-88-3) were charged. The contents were mixed well at room temperature until the PEG was dissolved. 4.1 grams of potassium hydride (30% wt dispersion in mineral oil, CAS 7693-26-7) was charged, and gas evolution resulted in bubbles and foaming of solution. 30 grams more of toluene was charged down the condenser to control foaming. Once the hydrogen gas evolution ceased, 9.99 grams of 1-bromo octadecane was added. 20 grams more toluene was used to rinse in the 1-bromooctadecane. The reaction was continued for 3 hours, and the byproduct salt was removed with a Buchner funnel fitted with Watman #4 filter paper. The toluene dissolved filtrant was isolated by removing toluene using a rotary evaporator at 60° C. with mechanical vacuum. A brown liquid was isolated, which solidified into a waxy solid at room temperature. The surface tension of the product was found to be 37.54 dynes/cm. The product was stable when stored at 40° C. for 35 days in 9.493 pH potassium hydroxide solution and did not show any signs of hydrolysis as indicated by no change in the surface tension.

In the second step, 0.9971 gram of the poly(ethylene oxide)-b-octadecane was dissolved in 2.9901 grams of steam distilled water and 1.0126 grams of PAP was added in a 100 mL roundbottom flask. The contents were mixed thoroughly on a magnetic stir plate overnight at room temperature. The dispersion was frozen by submersing the flask in a dry ice and acetone. The frozen product was attached to a freeze dryer vacuum system for 72 hours. After which, the encapsulated product was collected.

Example 2

Encapsulation of TAED with Nonionic Amphiphilic Graft Copolymer (PLMA-g-PEG)

In a 500 mL one neck round bottom flask fitted with a magnetic stirrer, 250 mL of hexane was added and 80 grams of TAED was slowly charged with mixing at 300 rpm on a magnetic stir plate. The contents were mixed at room temperature for four hours, and the solvent was removed using a rotary evaporator to produce the encapsulated TAED.

Figure 4A:
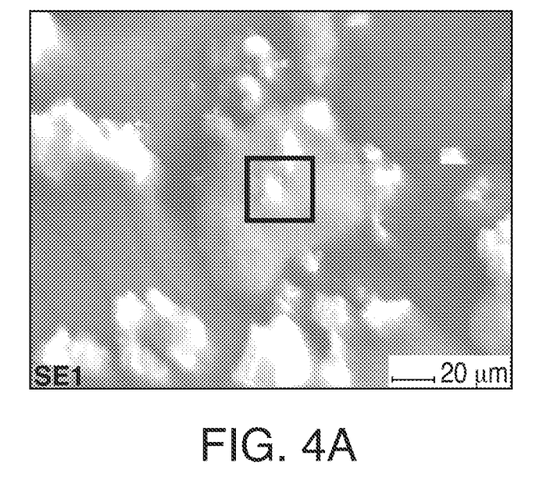
FIGS. 4A and 4B show an active ingredient before and after encapsulation as analyzed by Scanning Electron Microscopy/Energy Dispersive Analysis of X-rays, as described in Example 2.
Figure 4B:
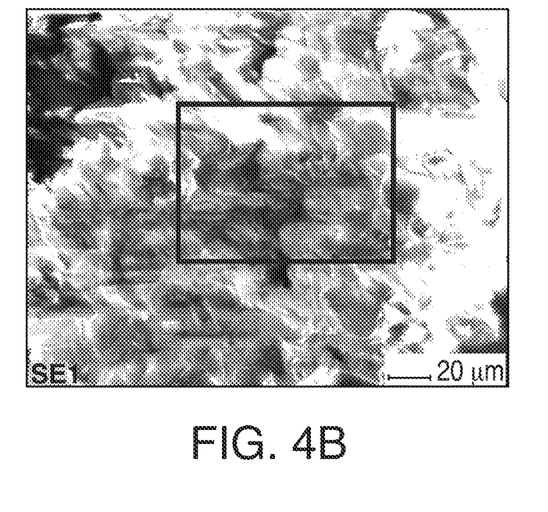
Figure 5A:
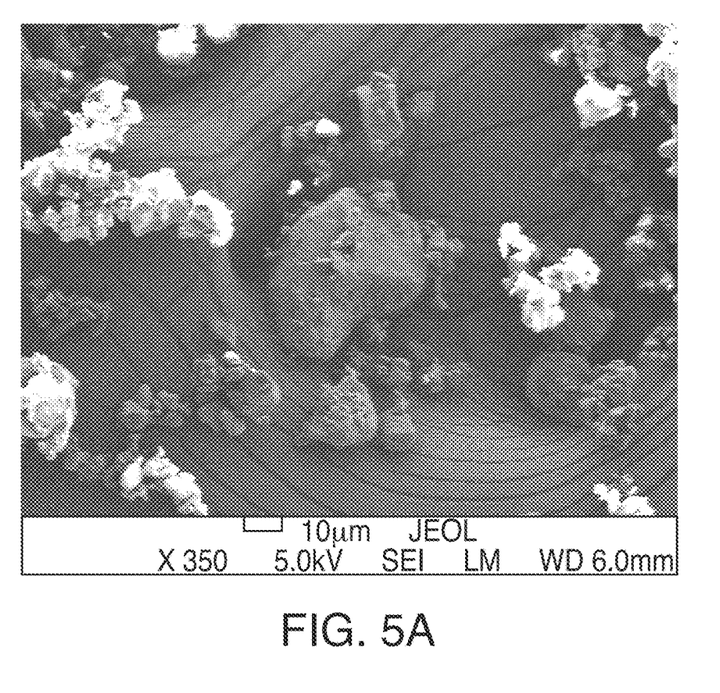
FIGS. 5A and 5B show electron microscope images of an active ingredient before and after encapsulation, as described in Example 2.
Figure 5B:
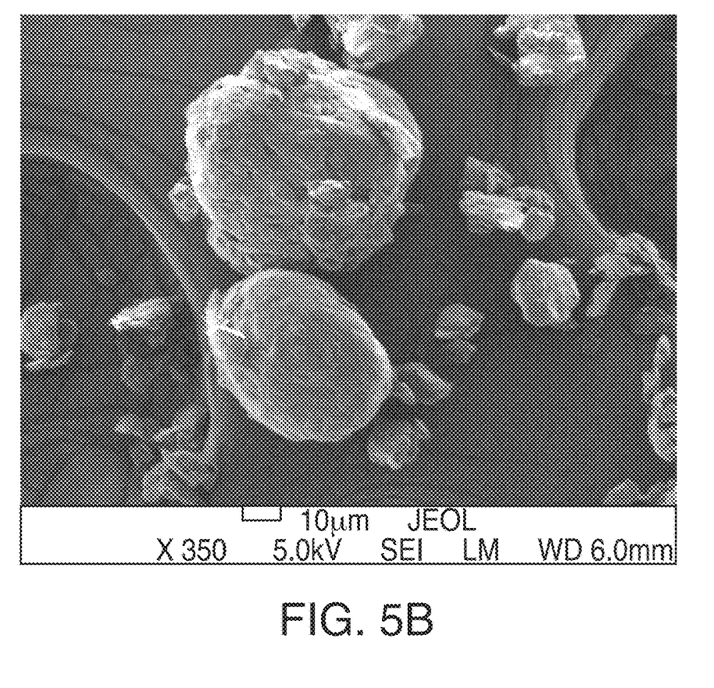

FIGS. 4A-5B show confirmation that TAED is encapsulated in nonionic amphiphilic graft copolymer (PLMA-g-PEG) using EDAX (Energy Dispersive Analysis of X-rays) together with SEM (Scanning Electron Microscopy). EDAX is an x-ray spectroscopic method for determining elemental compositions. SEM is an imaging method using electron beam. FIG. 4A shows the original non-encapsulated TAED, and FIG. 4B shows the encapsulated TAED in nonionic amphiphilic graft copolymer (PLMA-g-PEG). FIGS. 5A-5B show electron microscope images of TAED encapsulated in nonionic amphiphilic graft copolymer (PLMA-g-PEG) at lower magnification. FIG. 5A shows the original non-encapsulated TAED, and FIG. 5B shows the encapsulated TAED in nonionic amphiphilic graft copolymer (PLMA-g-PEG).

The nitrogen content of the non-encapsulated TAED is 20%, while the TAED encapsulated in nonionic amphiphilic graft copolymer (PLMA-g-PEG) has a nitrogen content of 5%. The very low nitrogen content on the surface of the product confirms that the TAED is coated with nonionic amphiphilic graft copolymer (PLMA-g-PEG).

Figure 6A:
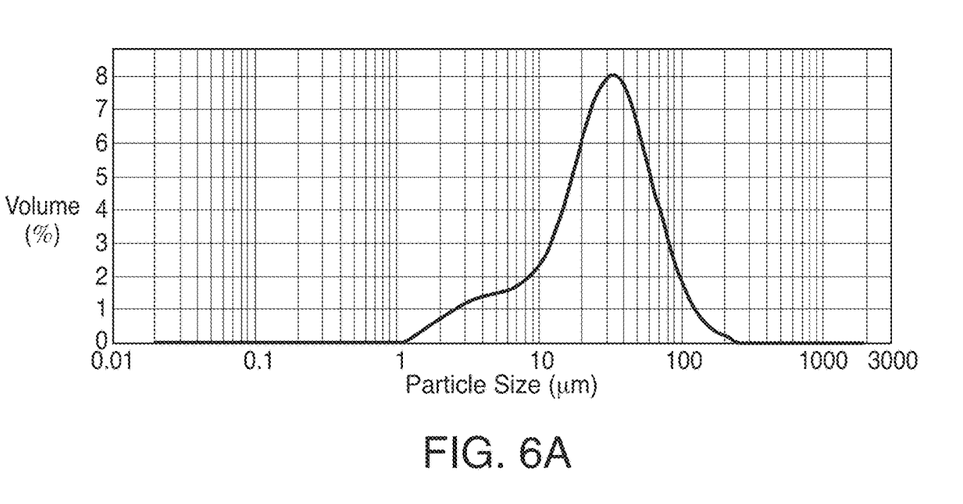
FIGS. 6A and 6B show graphs of the particle size distribution of an active ingredient before and after encapsulation, as described in Example 2.
Figure 6B:
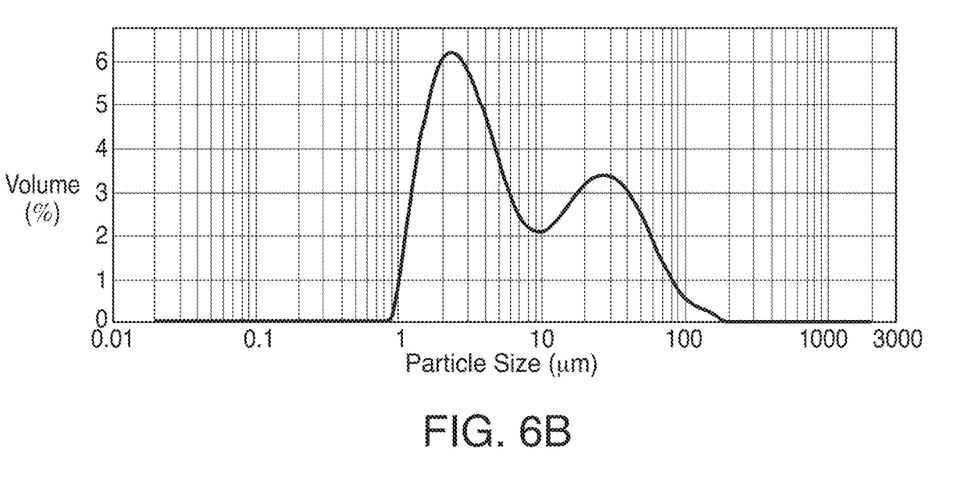

FIGS. 6A-6B show charts of the particle size distribution of TAED. FIG. 6A shows the particle size distribution of the original non-encapsulated TAED, and FIG. 6B shows the particle size distribution of the encapsulated TAED in nonionic amphiphilic graft copolymer (PLMA-g-PEG). The non encapsulated TAED had a majority of particles between 20-30 microns. Upon encapsulation, approximately 50% of the particles are distributed in the particle size range of 1 and 2 microns. This information also confirms the TAED is coated with the nonionic amphiphilic graft copolymer (PLMA-g-PEG).

Example 3

Encapsulation of TAED with (poly stearyl methacrylate-co-N,N'-dimethylamino ethyl methacrylate)

In the first step, poly stearyl methacrylate-co-N,N'-dimethylamino ethyl methacrylate was made as follows:

Into a three-necked 250 mL roundbottom flask fitted with an overhead stirrer (glass rod/Teflon stir blade), water cooled condenser, and a thermocouple-heating mantle-temperature controller network, and a dry inert argon gas inlet, 75.93 grams Stearyl methacrylate (Aldrich 411442), 75.01 grams N,N'-dimethylamino ethyl methacrylate (Aldrich 234907), 152.0 grams of Methyl Ethyl Ketone, and 0.30 grams of Azobisisobutyronitrile (AIBN) (Aldrich 441090) were charged. The contents were heated to 60° C., and the reaction conditions were maintained for 18 hours. The flask was slowly cooled to room temperature, and the contents were transferred to a one neck 250 mL flask. The solvent was removed using a rotary evaporator to yield the amphiphilic material.

In the second step, TAED was coated with poly acrylic acid as described in Example of B of U.S. Pat. No. 8,193,142.

In the third step, 15 grams of the surfactant obtained from first step was charged into a 500 mL roundbottom flask and 250 grams of hexane was added. To this mixture, 15 grams of the product obtained from second step was added, and the mixture was mixed over a stir plate for 3 hours. The hexane was removed using rotary evaporator to obtain the encapsulated TAED.

By about, we mean within 10% of the value, or within 5%, or within 1%.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

The invention claimed is:

1. A releasable encapsulation composition comprising:
a plurality of capsules each comprising an amphiphilic material encapsulating a substance, wherein the substance comprises a bleach activator or a peroxygen compound, the amphiphilic material forming micelles around the substance, wherein the amphiphilic material has hydrophilic and hydrophobic portions, wherein the hydrophilic portion anchors the encapsulated substance and the hydrophobic portion forms a shell wall of the capsule, and wherein the amphiphilic material is a modified N,N,N',N'-Tetrakis(2-hydroxypropyl)ethylenediamine, a nanoparticle which is a sol-gel-condensation of 3-aminopropyl trimethoxy silane and tridecafluoro-1,1,2,2-tetrahydrooctyl triethoxysilane, a nanoparticle which is a sol-gel condensation of 3-aminopropyl trimethoxy silane and trimethoxy(3,3,3-trifluoropropyl)silane, a Guerbet ester, or a poly(stearyl methacrylate-co-acrylic acid);

the substance being releasable from encapsulation by a change in association of the amphiphilic material onto the substance, triggered by a change in environment around the capsule, wherein the change in environment is dilution of a liquid in which the capsules are dispersed or a change in the pH of a liquid in which the capsules are dispersed.

2. The composition of claim 1 wherein the amphiphilic material has a hydrophilic-lipophilic balance within a range of from about 1 to about 20.

3. The composition of claim 1 wherein the amphiphilic material has a hydrophilic-lipophilic balance within a range of from about 18 to about 20.

4. The composition of claim 1 wherein the capsules are stable at alkaline pH.

5. The composition of claim 1 wherein the capsules have a critical micelle concentration within a range of from about 0.0001 wt % to about 50 wt %.

6. A product comprising:
the composition of claim 1; and
one or more additional ingredients useful for formulating the product.

7. The product of claim 6 wherein the product is a cleaning product, an oxygen delivery product, or a personal care product.

8. A releasable encapsulation composition comprising:
a plurality of capsules each comprising an amphiphilic material encapsulating a substance, wherein the substance comprises a bleach activator or a peroxygen compound, the amphiphilic material forming micelles around the substance, wherein the amphiphilic material has hydrophilic and hydrophobic portions, wherein the hydrophilic portion anchors the encapsulated substance and the hydrophobic portion forms a shell wall of the capsule, wherein the amphiphilic material has a hydrophilic-lipophilic balance within a range of from about 1 to about 20, wherein the capsules are stable at alkaline pH, and wherein the amphiphilic material is a modified N,N,N',N'-Tetrakis(2-hydroxypropyl)ethylenediamine, a nanoparticle which is a sol-gel-condensation of 3-aminopropyl trimethoxy silane and tridecafluoro-1,1,2,2-tetrahydrooctyl triethoxysilane, a nanoparticle which is a sol-gel condensation of 3-aminopropyl trimethoxy silane and trimethoxy(3,3,3-trifluoropropyl)silane, a Guerbet ester, or a poly(stearyl methacrylate-co-acrylic acid);

the substance being releasable from encapsulation by a change in association of the amphiphilic material onto the substance, triggered by a change in environment around the capsule, wherein the change in environment is dilution of a liquid in which the capsules are dispersed or a change in the pH of a liquid in which the capsules are dispersed.

9. The composition of claim 8 wherein the capsules have a critical micelle concentration within a range of from about 0.0001 wt % to about 50 wt %.

10. The composition of claim 8 wherein the amphiphilic material has a hydrophilic-lipophilic balance within a range of from about 18 to about 20.

* * * * *